US 7,667,729 B2

(12) United States Patent
Matsumoto et al.

(10) Patent No.: US 7,667,729 B2
(45) Date of Patent: Feb. 23, 2010

(54) MULTI-POINT CONFERENCE SYSTEM AND MULTI-POINT CONFERENCE DEVICE

(75) Inventors: Kouichi Matsumoto, Tokyo (JP); Kazunori Ozawa, Tokyo (JP)

(73) Assignee: NEC Corporation (JP)

( * ) Notice: Subject to any disclaimer, the term of this patent is extended or adjusted under 35 U.S.C. 154(b) by 276 days.

(21) Appl. No.: 10/599,321

(22) PCT Filed: Mar. 22, 2005

(86) PCT No.: PCT/JP2005/005093
§ 371 (c)(1),
(2), (4) Date: Sep. 25, 2006

(87) PCT Pub. No.: WO2005/094077
PCT Pub. Date: Oct. 6, 2005

(65) Prior Publication Data
US 2008/0218584 A1    Sep. 11, 2008

(30) Foreign Application Priority Data
Mar. 25, 2004    (JP) .............................. 2004-089434

(51) Int. Cl.
*H04N 7/15*    (2006.01)
(52) U.S. Cl. .................................. 348/14.09
(58) Field of Classification Search .............. 348/14.09, 348/14.08
See application file for complete search history.

(56) References Cited
U.S. PATENT DOCUMENTS
6,198,500 B1    3/2001    Watanabe et al.
6,963,353 B1 *  11/2005   Firestone .................. 348/14.09
2002/0071027 A1 * 6/2002  Sugiyama et al. ........ 348/14.09
2004/0081209 A1    4/2004    Mio et al.

FOREIGN PATENT DOCUMENTS
EP    1439714    7/2004
(Continued)

OTHER PUBLICATIONS
Office Action issued by the Japanese Patent Office on Mar. 25, 2008 in connection with corresponding Japanese Patent Application No. 2005-518742.
Translation of the Office Action issued by the Japanese Patent Office on Mar. 25, 2008 in connection with corresponding Japanese Patent Application No. 2005-518742.
(Continued)

Primary Examiner—Stella L Woo
(74) Attorney, Agent, or Firm—Ostrolenk Faber LLP

(57) ABSTRACT

There are provided a multi-point conference system and a multi-point conference device capable of using an SIP terminal as a conference terminal and clearly and smoothly performing speaker switching without requesting a conference terminal to transmit an intra frame when a speaker is detected. The multi-point connection device includes an image processing unit for accumulating in a memory (13), image data from the conference terminal participating in the conference, and decoding the image data on the speaker accumulated in the memory (13) and re-encoding the decoded image upon detection of a speaker in a medium processing unit (15). Upon switching of a speaker, the image processing unit re-encodes the first image as an intra frame and transmits the image data to conference terminals other than that of the speaker, so that the conference terminals other than that of the speaker can perform decoding from the intra frame, thereby clearly and smoothly performing the speaker switching.

19 Claims, 5 Drawing Sheets

FOREIGN PATENT DOCUMENTS

| | | |
|---|---|---|
| JP | A-02-274084 | 11/1990 |
| JP | A-3-99592 A | 4/1991 |
| JP | A-7-107461 | 4/1995 |
| JP | 07-222129 | 8/1995 |
| JP | A08-331535 | 12/1996 |
| JP | A-11-220711 | 8/1999 |
| JP | 2000-270305 | 9/2000 |
| JP | P2001-45495 A | 2/2001 |
| JP | P2001-69474 A | 3/2001 |
| JP | P2002-176503 A | 6/2002 |
| JP | 2002-209195 | 7/2002 |
| JP | WO 02/065245 | 8/2002 |
| JP | 2002-262251 | 9/2002 |
| JP | 2003-244130 | 8/2003 |
| JP | P2003-244130 A | 8/2003 |
| JP | P2004-72741 A | 3/2004 |
| WO | WO 2002/065245 A2 | 8/2002 |
| WO | WO 2005/017674 | 2/2005 |
| WO | WO 2005/017674 A2 | 2/2005 |

OTHER PUBLICATIONS

Supplemental European Search Report dated May 7, 2007 corresponding to European Application No. 05 72 1243, PCT/JP2005/005093.
International Search Report PCT/JP2005/005093 dated Jun. 14, 2005 (Japanese Patent Office).
Office Action issued by the Korean Patent Office on Sep. 27, 2007 in connection with corresponding Korean Patent Application No. 10-2006-7018300.
Japanese Translation of the Office Action issued by the Korean Patent Office on Sep. 27, 2007 in connection with corresponding Korean Patent Application No. 10-2006-7018300.
English Translation of the Office Action issued by the Korean Patent Office on Sep. 27, 2007 in connection with corresponding Korean Patent Application No. 10-2006-7018300.
Singapore Search Report and Written Opinoin dated Sep. 22, 2008 in Singapore Appln. No. 200606536-1.
Austrian Search Report dated Aug. 1, 2008.
Chinese Office Action dated Oct. 17, 2008 (with English translation of relevant parts).

* cited by examiner

MULTI-POINT CONFERENCE SYSTEM AND MULTI-POINT CONFERENCE DEVICE

CROSS REFERENCE TO RELATED APPLICATION

The present application is a 35 U.S.C. §§ 371 national phase conversion of PCT/JP2005/005903 filed 22 Mar. 2005 which claims priority to Japanese Patent Application No: 2004-089434 filed 25 Mar. 2004, which are herein incorporated by reference. The PCT International Application was published in the Japanese language.

TECHNICAL FIELD

The present invention relates to a multi-point communication system and particularly to a multi-point conference system and multi-point conference device.

BACKGROUND ART

In conventional multi-point conference systems, one of the following methods is used as a method for detecting a speaker from a plurality of conference terminals:

(1) a multi-point conference device detects the speaker;

(2) a conference terminal notifies the multi-point conference device that the conference terminal is a speaker.

In the both methods described above, if the multi-point conference device identifies a new speaker and directly switches to a new speaker, there may happen such a case where switching of a speaker is done in the middle of an inter frame (an inter frame coded frame). As a result, conference terminals except for the speaker cannot perform the switching of a speaker smoothly until they receive an intra frame (an intra-frame coded frame).

Therefore, in order to switch the image of a speaker, a terminal which is a speaker is requested to transmit or re-transmit an intra frame.

As an example of a conventional multi-point conference system, reference will be made to the system disclosed in Patent Document 1 where a conference terminal notifies the multi-point conference device that the conference terminal will become a speaker. This system has a configuration comprising a plurality of conference terminals arranged at multiple points and a multi-point communication control unit (multi-point conference device). The conventional multi-point conference system operates as follows.

(A1) When a multi-point conference device is requested from an optional conference terminal to perform speaker switching, the multi-point conference device requests the conference terminal that has requested the speaker switching to transmit or retransmit an intra frame and the other conference terminals participating in the conference to freeze images currently displayed by respective conference terminals until the reception of an intra frame transmitted by the multi-point conference device.

(A2) Receiving the request to transmit an intra frame from the multi-point conference device, the conference terminal transmits an intra frame to the multi-point conference device. Meanwhile, the conference terminals that have received the request to freeze images from the multi-point conference device freeze currently displayed image until they receive the intra frame.

(A3) The multi-point conference device, on receipt of the intra frame from the speaker terminal, transmits an intra frame to the other conference terminals. The conference terminals except for the speaker, on receipt of the intra frame, release freeze and switch respective images using an intra frame.

As described above, in the conventional multi-point conference system, the multi-point conference device is able to perform speaker switching by sending to a conference terminal which will become a speaker an intra frame transmission request and making the speaker conference terminal transmit an intra frame to the multi-point conference device.

Further, in publications relating to multi-point conference systems, for instance a multi-point control unit detecting a picture header of video data from multiplexed data from each video-conference terminal, extracting only intra frame video data subjected to intra-frame coding and synthesizing the extracted intra frame video data is disclosed in Patent Document 2 (discussed later). Further, a multi-point video-meeting control system capable of switching video data and audio data without causing a sense of incongruity is disclosed in Patent Document 3 (discussed later). In Patent Document 3, a structure in which intra frame data is detected from video data, intra frame detection information is generated, and switching to the video data of the terminal selected as the speaker is performed according to the generated intra frame detection information is disclosed. Further, in Patent Document 4 (discussed later), a multi-point communication system where the current speaker is accurately identified is disclosed.

[Patent Document 1]
Japanese Patent Kokai Publication No. JP-A-02-274084 (p. 3, FIG. 1)

[Patent Document 2]
Japanese Patent Kokai Publication No. JP-P2001-69474A (p. 3, FIG. 1)

[Patent Document 3]
Japanese Patent Kokai Publication No. JP-P2002-176503A (p. 3, FIG. 1)

[Patent Document 4]
Japanese Patent Kokai Publication No. JP-A08-331535 (pp. 2-3, FIG. 1)

DISCLOSURE OF THE INVENTION

Problems to be Solved by the Invention

However, the systems mentioned above have the following problems.

The first problem is that switching to the image of the speaker cannot be performed clearly when SIP terminals are used as conference terminals.

SIP terminals use SIP (Session Initiation Protocol) defined by the IETF standard RFC3261 (2543) for call processing and perform real-time, bi-directional multimedia communication over an IP network. For media transfer, RTP (Real-time Transport Protocol) that supports real-time transmission and UDP (User Datagram Protocol) which has no re-transmission procedure.

Therefore, the request to retransmit an image is not supported. As a result, when performing switching of a speaker, the multi-point conference device cannot request an intra frame from the SIP terminal and the speaker switching cannot be performed clearly because no intra frame is retransmitted.

The second problem is that it takes time until the switching of a speaker is performed smoothly.

The reason is that, since the multi-point conference device performs the switching of a speaker in the middle of an inter frame transmitted by a previous speaker SIP terminal, the switching of a speaker cannot be performed clearly until a speaker SIP terminal transmits an intra frame and the non-speaker SIP terminals receive the intra frame.

Accordingly, it is an object of the present invention to provide a multi-point conference system and multi-point conference device capable of switching to the image of a new speaker clearly even when SIP terminals are used as conference terminals.

Another object of the present invention is to provide a multi-point conference system and multi-point conference device capable of speaker switching smoothly.

Means to Solve the Problems

In order to achieve the above objects, the outline configuration of the invention disclosed in the present application is as follows.

The present invention is applied to a multi-point conference system where SIP (Session Initiation Protocol) terminals, which do not support re-transmission request function, are able to participate, and by having a multi-point conference device process the image data from a SIP terminal targeted for switching at the time of speaker switching and by transmitting an intra frame to the other SIP terminals participating in the conference as the first image data at the time of switching, the image of the speaker displayed on the SIP terminals at the time of switching of an image does not get corrupted and the switching of a speaker can be performed smoothly.

In a multi-point conference system in accordance with an aspect of the present invention that comprises a plurality of terminals and a multi-point conference device connected to a plurality of terminals and that performs a conference by transmitting/receiving image and audio, the multi-point conference device comprises a medium processing unit for detecting a speaker, a memory unit for holding an image from a terminal participating in a conference, and an image processing unit for decoding the image of a speaker when the medium processing unit detects a speaker and for re-encoding the decoded image, wherein the image processing unit transmits an intra frame as an image frame at the time of speaker switching when the medium processing unit detects a speaker.

In the present invention, the image processing unit comprises a decoder unit for decoding the image of a speaker held in the memory unit according to the result of speaker detection by the medium processing unit, a reference image memory unit for holding a reference image obtained by having the decoder unit decode the last image of a speaker held in the memory unit and an encoder unit for re-encoding an image obtained by having the decoder unit decode an image received after a speaker is detected based on a reference image held in the reference image memory unit, and encodes at least the first frame of the image of a speaker received after a speaker is detected as an intra frame.

In a method relating to another aspect of the present invention, the first image is re-encoded as an intra frame when image data received after speaker detection is decoded/re-encoded by speaker switching processing means after detecting speaker switching, the subsequent images are re-encoded as inter frames, and the image data is transmitted to the non-speaker SIP terminals. By doing this, it is possible to have the non-speaker SIP terminals decode the intra frame at the time of speaker switching.

Meritorious Effect of the Invention

According to the present invention, by transmitting an intra frame at the time of speaker switching, images do not get corrupted when switching to the image of a speaker and the switching can be performed smoothly.

The reason is that, when image data received after speaker detection is decoded/re-encoded, the image data is transmitted to the non-speaker SIP terminals with the first image re-encoded as an intra frame and the subsequent images as inter frames in the present invention.

According to the present invention, switching to the image of a speaker is performed smoothly without depending on a conference terminal (software).

The reason is that a conference system device performs the image switching processing in the present invention.

According to the present invention, the switching of an image of a speaker can be performed smoothly even in a real-time protocol (RTP).

The reason is that, since an intra frame transmission request is not issued in the present invention, the processing of switching of a speaker can be performed immediately after a speaker is detected.

EXPLANATIONS OF SYMBOLS

Figure 1:
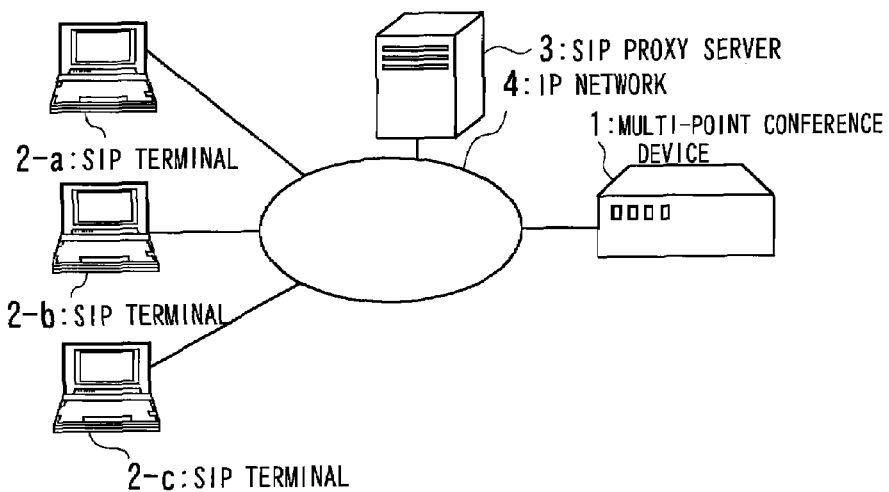
FIG. 1 is a diagram illustrating the system configuration of a first embodiment of the present invention.

1: multi-point conference device
2-a to 2-c: SIP terminal
3: SIP proxy server
4: IP network
5: 3G network
6-a to 6-c: terminal
11: RTP receive unit
12: call processing unit
13: memory
14: conference control unit
15: medium processing unit
16: RTP transmission unit
20: image processing unit
21: decoder
22: reference image memory
23: encoder
31: receive unit
32: transmission unit

MOST PREFERRED MODE FOR CARRYING OUT THE INVENTION

Preferred embodiments of the present invention are described in detail with reference to the attached drawings. FIG. 1 is a diagram illustrating the configuration of an embodiment of the present invention.

Referring to FIG. 1, a system relating to the first embodiment of the present invention comprises a multi-point conference device 1, SIP terminals 2-a to 2-c, an SIP proxy server 3, and an IP network 4 for connecting these devices. In FIG. 1, the multi-point conference device 1 transmits/receives medium data and performs speaker switching. The SIP terminals 2-a to 2-c transmit their image/audio data to the multi-point conference device 1 and output the image/audio data of a speaker received from the multi-point conference device 1 to devices.

The SIP proxy server relays SIP data between the SIP terminals 2-a to 2-c and the multi-point conference device 1.

Figure 2:
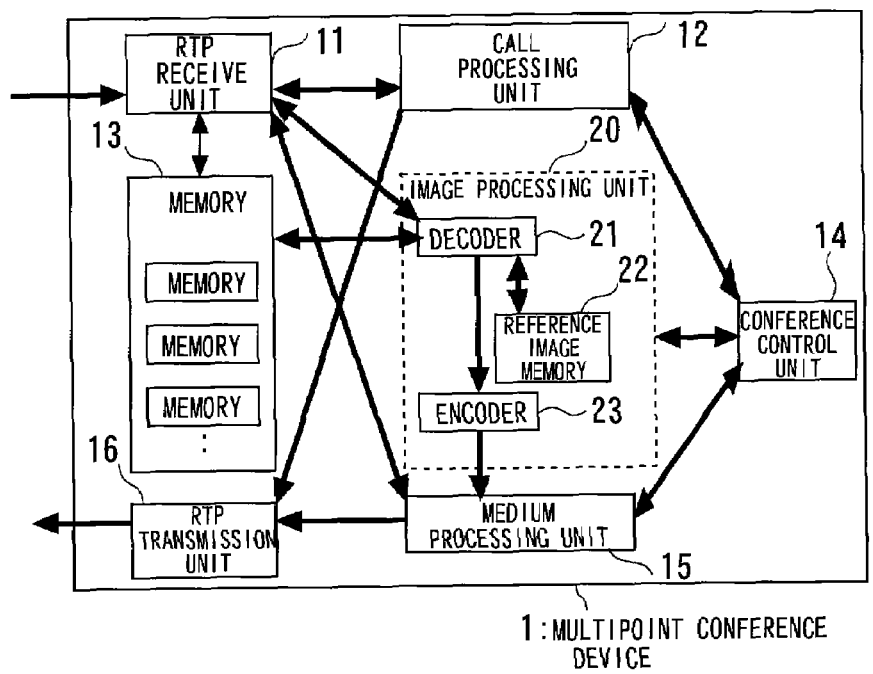
FIG. 2 is a diagram illustrating the configuration of a multi-point conference device of the first embodiment of the present invention.

FIG. 2 is a diagram illustrating the configuration of the multi-point conference device 1 in FIG. 1. The multi-point conference device 1 comprises an RTP receive unit 11, a call processing unit 12, a memory 13, a conference control unit 14, a medium processing unit 15, an RTP transmission unit 16, and an image processing unit 20. The image processing unit 20 comprises a decoder 21, a reference image memory 22, and an encoder 23.

In FIG. 2, the RTP receive unit 11 receives an RTP/UDP/IP packets from the SIP terminal 2-a and extracts an RTP payload part.

When the extracted RTP payload part is of a SIP protocol, the RTP payload part is supplied to the call processing unit 12, and when the extracted RTP payload part is medium data, the RTP payload is supplied to the medium processing unit 15.

The call processing unit 12 performs call processing for the session and notifies the result of the call processing to the RTP transmission unit 16.

Further, the call processing unit 12 notifies the IP addresses and medium reception ports of the conference participants to the conference control unit 14.

For the SIP terminals 2-a to 2-c participating in the conference, the medium processing unit 15 mixes media transmitted from the other SIP terminals. At the same time, it detects a speaker and notifies the result of the speaker detection to the conference control unit 14.

The conference control unit 14 manages conference participant information such as the IP addresses and medium reception ports of the conference participants.

Further, when the conference control unit 14 is notified of the speaker detection result by the medium processing unit 15, the conference control unit 14 notifies the image processing unit 20 to start the processing for switching of a speaker.

The image processing unit 20, on receipt of the notification from the conference control unit 14 that it should start the processing for switching of a speaker, copies the data targeted for switching from the memory 13 out of video RTP packet data from each SIP terminal accumulated in the memory 13.

The memory 13 respectively accumulates the video RTP packet from each of the SIP terminals 2-a to 2-c participating in the conference.

In the image processing unit 20, the decoder 21 decodes the image data of the speaker switching target copied from the memory 13.

The last image decoded is accumulated in the reference image memory 22.

Then the decoder 21 directly copies video RTP data of the speaker targeted for switching from the RTP receive unit 11, performs decoding processing according to the reference image accumulated in the reference image memory 22, and supplies the decoded image to the encoder 23.

The encoder 23 re-encodes the image decoded by the decoder 21 and copies the re-encoded image data to the medium processing unit 15.

The medium processing unit 15 mixes the re-encoded image copied from the encoder 23 so as to be transmitted to the non-speaker terminals and copies the resulting image data to the RTP transmission unit 16.

The RTP transmission unit 16 packetizes the medium data received from the medium processing unit 15 into an RTP/UDP/IP packet and transmits the resulting packet to the SIP terminals 2-b and 2-c.

Further, when the call processing unit 12 requests the RTP transmission unit 16 to transmit SIP data, the RTP transmission unit 16 packetizes SIP data into an RTP/UDP/IP packet and transmits the resulting packet to the destination SIP terminals 2-a to 2-c.

Figure 3:
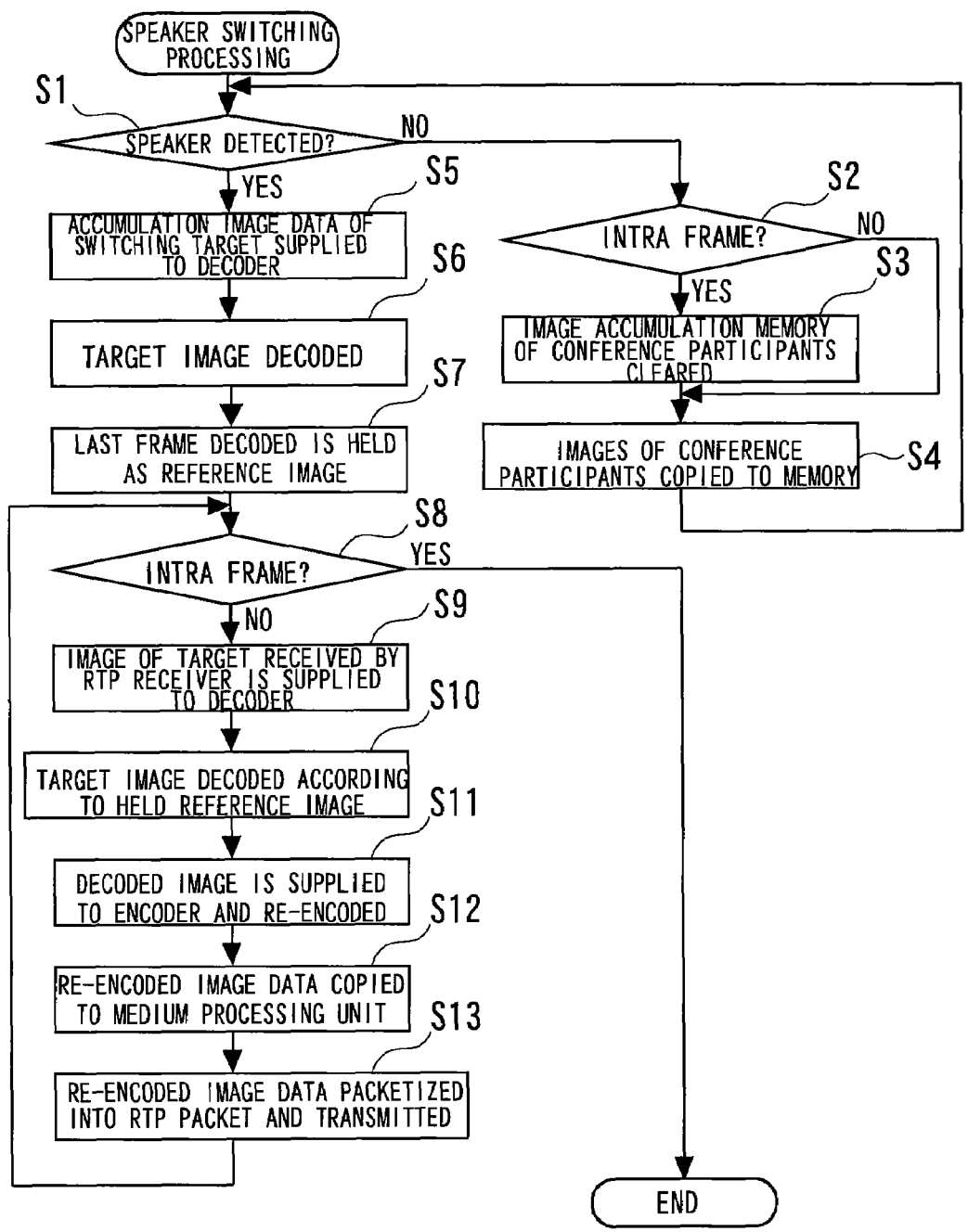
FIG. 3 is a flowchart for explaining the operation of processing of switching of a speaker in the first embodiment of the present invention.

FIG. 3 is a flowchart for explaining the operation of the embodiment of the present invention. Next, using the flowchart shown in FIG. 3, the operation of speaker switching of the multi-point conference device according to the present embodiment will be described in detail.

First, the medium processing unit 15 constantly checks whether a new speaker is detected (a step S1).

When a speaker is not detected by the medium processing unit 15, the RTP receive unit 11 checks the video RTP header of each conference participant except for the current speaker (a step S2).

After the video RTP header of each conference participant except for the current speaker is checked and when the video RTP header of the SIP terminal 2-a (a conference participant) is not an intra frame (it means it is an inter frame), the RTP receive unit 11 copies the video RTP payload of the SIP terminal 2-a to the memory 13 (a step S4).

When the video RTP header of the SIP terminal 2-a is an intra frame, the RTP receive unit 11 clears the video RTP payload that has been copied to the memory 13 for the SIP terminal 2-a (a step S3), and copies the video RTP payload to the memory 13 (a step S4).

When the medium processing unit 15 detects that the SIP terminal 2-a is a speaker ("YES" in the step S1), the image processing unit 20 supplies the video RTP payload data of the SIP terminal 2-a accumulated in the memory 13 to the decoder 21 (a step S5).

The decoder 21 decodes the video data supplied (a step S6). It saves the last image frame decoded in the reference image memory 22 temporarily (a step S7).

During the time between the speaker detection and the saving of the reference image in the reference image memory 22, the RTP receive unit 11 checks the video RTP header from the SIP terminal 2-a, which is the speaker (a step S8). When the video RTP header of the SIP terminal 2-a is an intra frame, the medium processing unit 20 stops supplying the video RTP header of the SIP terminal 2-a to the decoder 21, and the video RTP header of the SIP terminal 2-a is supplied to the medium processing unit 15, completing the processing for switching of a speaker.

When the video RTP header of the SIP terminal 2-a is not an intra frame (it means it is an inter frame), the RTP receive unit 11 supplies the video RTP payload of the SIP terminal 2-a to the decoder 21 (a step S9).

The decoder 21 starts decoding the video RTP payload according to the image frame temporarily saved in the reference image memory 22 (a step S10).

The decoded image data is supplied to the encoder 23 and re-encoded (a step S11).

When the encoder 23 re-encodes the decoded image data, it encodes the first frame as an intra frame and subsequent frames as inter frames. The re-encoded image data is copied to the medium processing unit 15 (a step S12).

The medium processing unit 15 copies entire audio RTP payloads of conference participants from the RTP receive unit 11 and mixes them. The mixed audio RTP payloads and the re-encoded image data are copied to the RTP transmission unit 16. The RTP transmission unit 16 packetizes the image and audio data received from the medium processing unit 15 into an RTP/UDP/IP packet and transmits the resulting packet to the non-speaker SIP terminals 2-*b* and 2-*c* (a step S13).

The RTP receive unit 11 supplies an image frame on to the decoder 21 and then checks the received video RTP header of the SIP terminal 2-*a*, which is the speaker (a step S8).

When the video RTP header of the speaker is not an intra frame (it means that it is an inter frame), the processing for switching of a speaker (the steps S9 to S13) continues. On the other hand, when it is an intra frame, supplying of the video RTP payload of the SIP terminal 2-*a* to the decoder 21 is stopped and the video RTP payload of the SIP terminal 2-*a* is supplied to the medium processing unit 15, completing the processing for switching of a speaker.

Next, a second embodiment of the present invention will be described in detail with reference to the drawings.

The configuration of the second embodiment of the present invention is the same as that of the first embodiment described above, however, the second embodiment differs from the first embodiment in the sense that, by an instruction from the medium processing unit 15, the RTP transmission unit 16 controls to transmit a SIP method (for instance INFO method) that includes information indicating an intra frame transmission request to the SIP terminal 2-*a* (the speaker) when the medium processing unit 15 detects a speaker.

When detecting a speaker, the medium processing unit 15 notifies the speaker detection result to the conference control unit 14. At the same time, the medium processing unit 15 notifies the RTP transmission unit 16 to transmit the intra frame transmission request to the speaker.

The RTP transmission unit 16 transmits an INFO method that includes information indicating an intra frame transmission request to the SIP terminal 2-*a*, which is the speaker.

After receiving the INFO method, the SIP terminal 2-*a* encodes the image frame to transmit the encoded frame as an intra frame which is transmitted next according to the request information and transmits the image packet, which is an intra frame, to the multi-point conference device 1. The operation hereafter is the same as that of the first embodiment described above.

Figure 4:
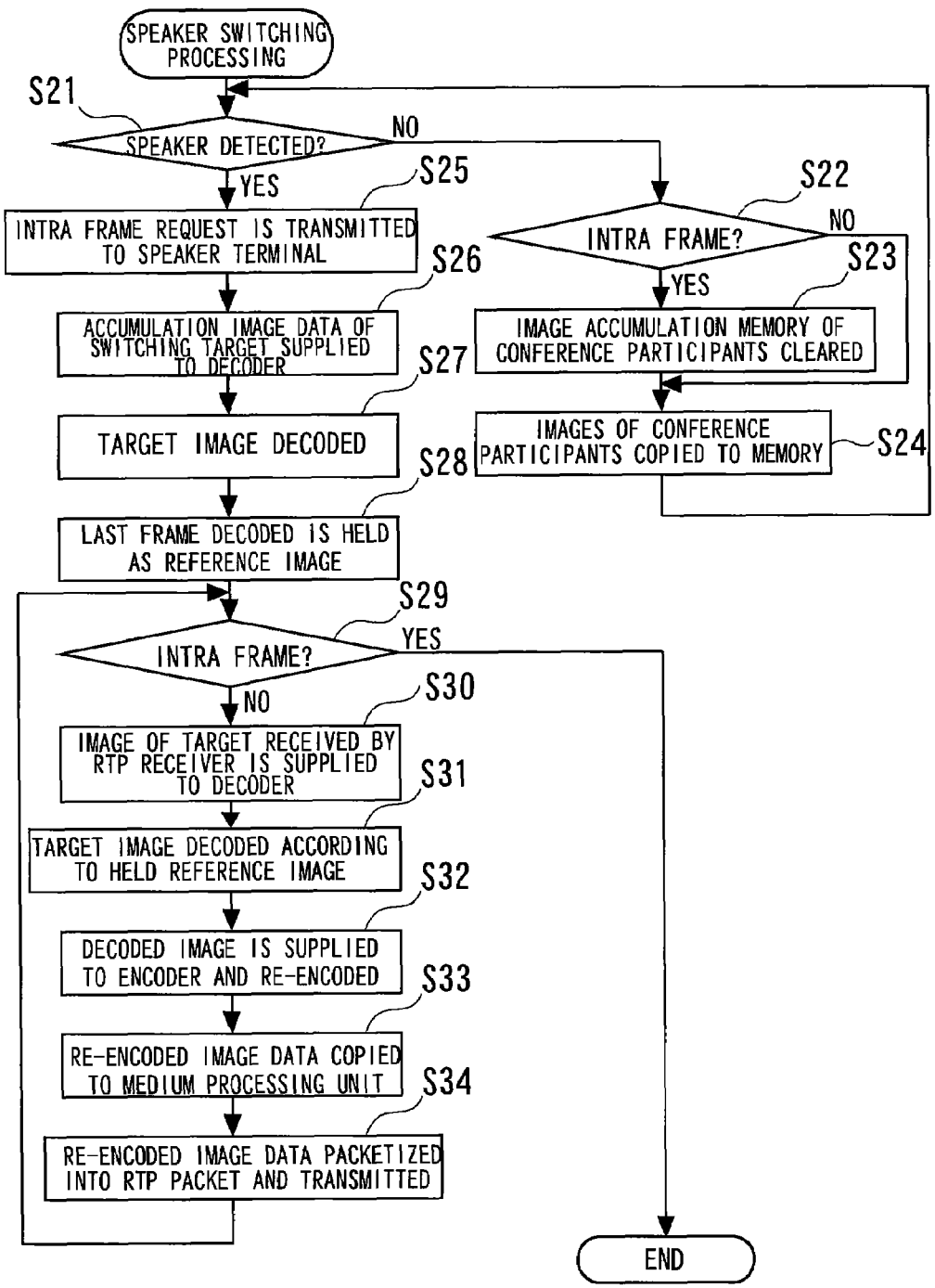
FIG. 4 is a flowchart for explaining the operation of processing of switching of a speaker in a second embodiment of the present invention.

FIG. 4 is a flowchart for explaining the operation of the second embodiment of the present invention. The processing for performing speaker switching by the multi-point conference device 1 of the present embodiment will be described in detail with reference to FIG. 4.

Since steps S21, S22, S23 and S24 of the flowchart in FIG. 4 are identical to the steps S1, S2, S3 and S4 of the flowchart in FIG. 3, the explanations of these will be omitted.

When the SIP terminal 2-*a* is detected as a speaker (the step S21), the RTP transmission unit 16 is notified to transmit the intra frame transmission request to the speaker, and the RTP transmission unit 16 transmits the INFO method that includes the intra frame transmission request information to the SIP terminal 2-*a* which is the speaker (a step S25).

Since steps S26 to 34 (the procedure after the INFO method is transmitted to the speaker SIP terminal 2-*a*) are the same as the steps S5 to S13 of the first embodiment shown in FIG. 3, the explanations of these will be omitted.

As described, the request for intra frame transmission is made immediately after a speaker is detected in the present embodiment and hence an image of a speaker can be switched more smoothly than in the first embodiment in which the processing for switching of a speaker has to be continued until the speaker conference terminal transmits an intra frame.

In the present embodiment, the INFO method is used as a SIP method, however, other SIP methods may be used. Further, a SIP method is used for requesting intra frame transmission in the present embodiment, however, other commands requesting intra frame transmission may be used.

Further, the conference terminals transmit an intra frame when they receive a intra frame transmission request in the present embodiment, however, they may not respond to the intra frame transmission request.

Next, a third embodiment of the present invention will be described in detail with reference to the drawings.

Figure 5:
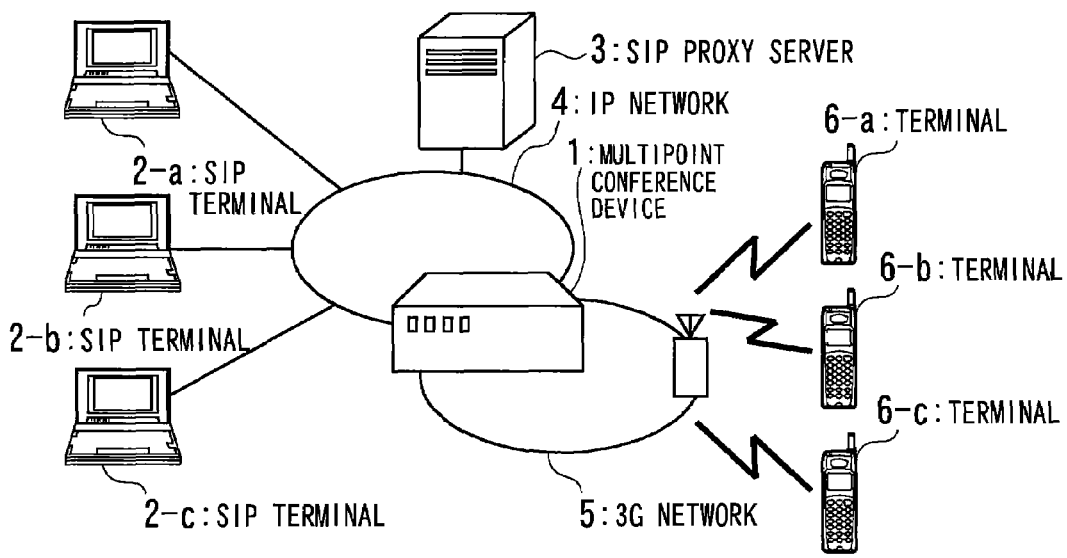
FIG. 5 is a diagram illustrating the system configuration of a third embodiment of the present invention.
Figure 6:
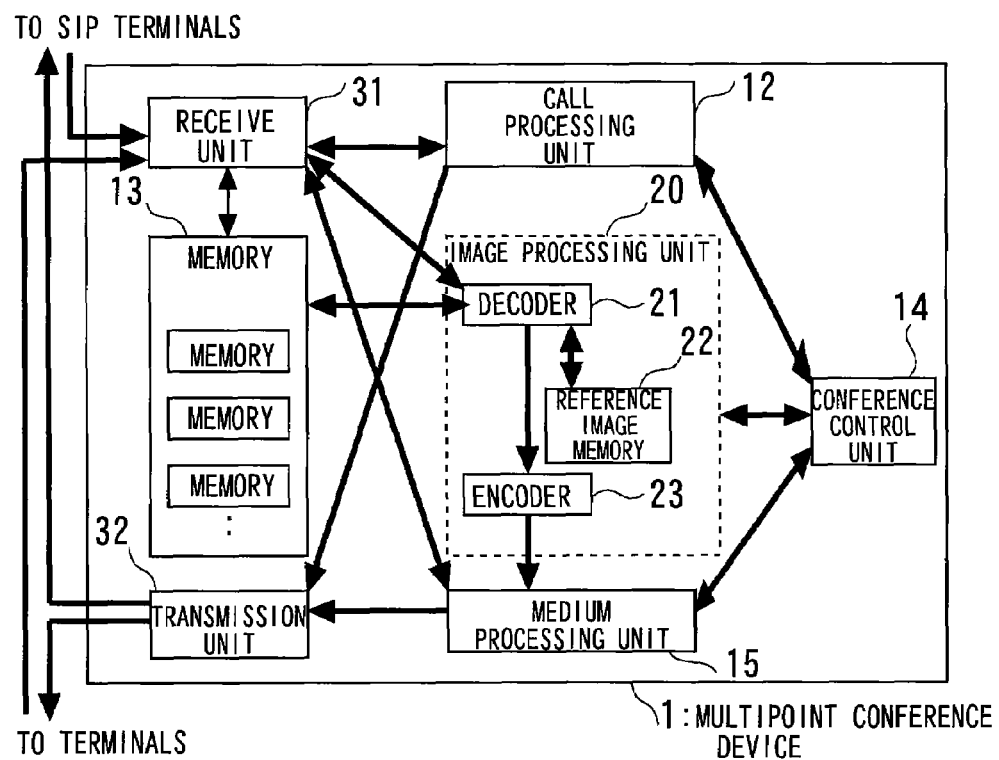
FIG. 6 is a diagram illustrating the configuration of a multi-point conference device of the third embodiment of the present invention.

FIGS. 5 and 6 show the configuration of the third embodiment of the present invention. In addition to the system configuration of the first embodiment shown in FIG. 1, the present embodiment comprises a 3G network 5 and terminals 6-*a* to 6-*c*. Further, in the present embodiment, the RTP receive unit 11 and the RTP transmission unit 16 in the function block of the multi-point conference device of the first embodiment shown in FIG. 2 are replaced by a receive unit 31 and a transmission unit 32 respectively.

In FIG. 5, the terminals 6-*a* to 6-*c* are the third-generation telephones (3G-324M) capable of providing image and audio communication, and the 3G network 5 is a network to which the terminals 6-*a* to 6-*c* are connected.

The multi-point conference device 1 performs a multi-point conference between the SIP terminals 2-*a* to 2-*c* and the terminals 6-*a* to 6-*c* by carrying out heterogeneous network connection between the IP network 4 and the 3G network 5.

In FIG. 6, the receive unit 31 receives data from the terminal 6-*a* and extracts data. When the extracted data is call signaling Q.931 data, the data is supplied to the call processing unit 12, and when the extracted data is medium data, the data is supplied to the medium processing unit 15.

The call processing unit 12 performs call connection processing and notifies the call processing result to the transmission unit 32.

Further, the call processing unit 12 notifies the telephone number and user ID of the terminal 6-*a* (a conference participant) to the conference control unit 14.

For the SIP terminals 2-*a* to 2-*c* and the terminals 6-*b* and 6-*c* participating in the conference, the medium processing unit 15 mixes media transmitted from the other conference terminals. When the image/audio codecs used by the SIP terminals 2-*a* to 2-*c* and the terminals 6-*a* to 6-*c* are different, the medium data are decoded by the medium processing unit 15, re-encoded in accordance with the codec of each conference terminal, and then mixed.

At the same time, the medium processing unit 15 detects a speaker. Since the operations from the notification to the conference control unit 14 of the speaker detection result by the medium processing unit 15 to the accumulation of image data from each conference terminal by the memory 13 are identical to those of the first embodiment shown in FIG. 2, the explanations will be omitted.

In the image processing unit 20, the decoder 21 decode the image data of the speaker targeted for switching copied from the memory 13 in accordance with the image codec used by the speaker terminal.

Since the operation of accumulating the last image decoded in the reference image memory 22 and supplying the decoded image to the encoder 23 is the same as that of the first embodiment shown in FIG. 2, the explanation of it will be omitted.

When the encoder 23 re-encodes the image decoded by the decoder 21, it re-encodes in accordance with image codecs of respective non-speaker conference terminals and copies the re-encoded image data to the medium processing unit 15. The medium processing unit 15 mixes the image data re-encoded in accordance with image codecs of the non-speaker conference terminals and copied from the encoder 23 for being transmitted to the corresponding conference terminals, and copies the mixed image data to the transmission unit 32.

The transmission unit 32 transmits the medium data received from the medium processing unit 15 to the SIP terminals 2-*a* to 2-*c* and the terminals 6-*b* and 6-*c* according to the media formats of the IP network 4 and the 3G network 5. Further, the transmission unit 32 transmits the medium data to the target terminals 6-*a* to 6-*c* according to the call processing result notified by the call processing unit 12 via call processing Q.931.

Since the operation performed for the SIP terminals 2-*a* to 2-*c* is the same as that of the first embodiment described above (refer to FIG. 2), the explanation of it will be omitted.

Figure 7:
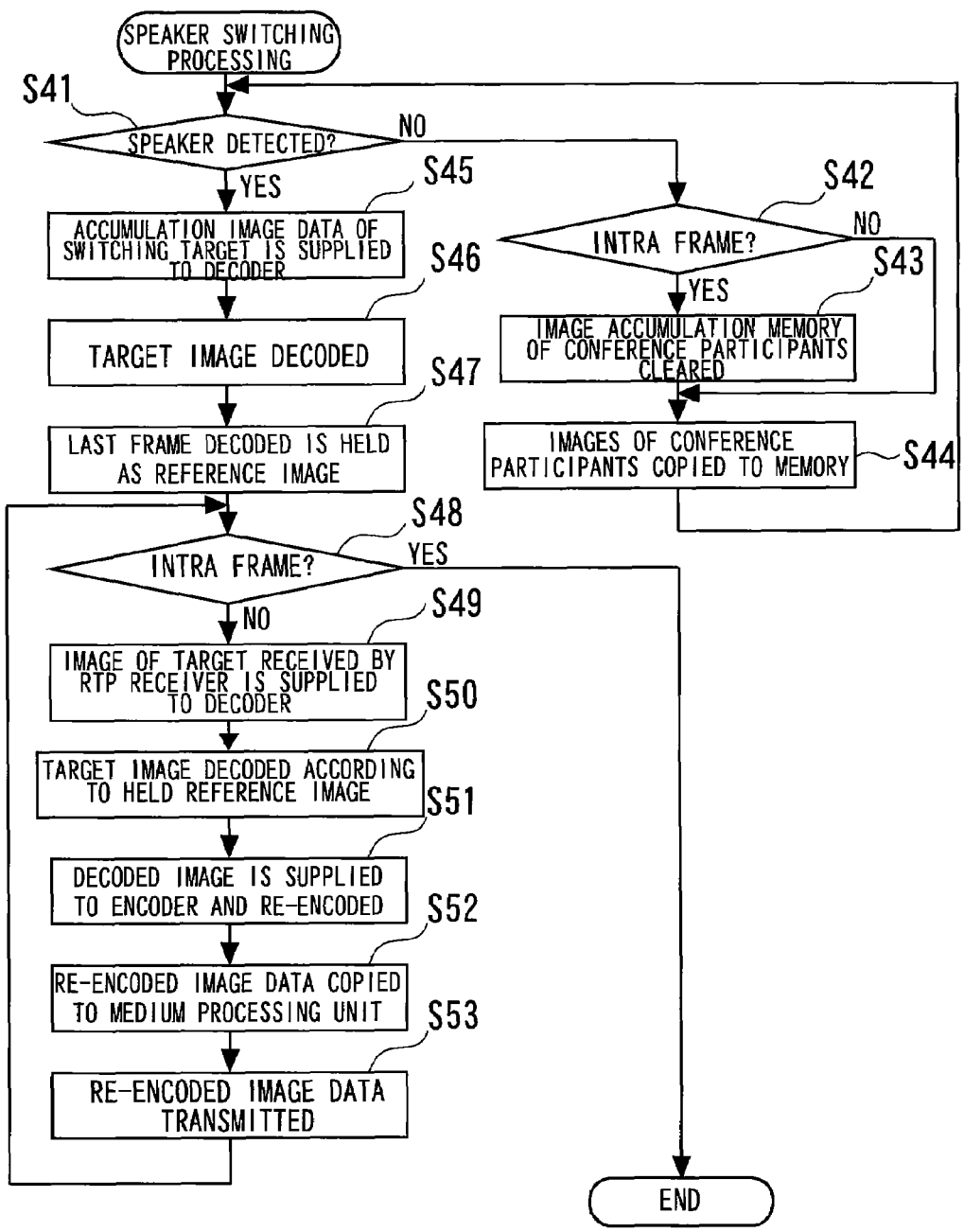
FIG. 7 is a flowchart for explaining the operation of processing of switching of a speaker in the third embodiment of the present invention.

Next, referring to a flowchart in FIG. 7, the processing for switching of a speaker by the multi-point conference device 1 of the present embodiment will be described in detail.

First, the medium processing unit 15 constantly checks whether a new speaker is detected (a step S41).

When no speaker is detected, the receive unit 31 checks the image data of each conference participant except for the current speaker (a step S42). After the image data of each conference participant except for the current speaker is checked and when the image data of the terminal 6-*a* (a conference participant) is not an intra frame (it means it is an inter frame), the image data of the terminal 6-*a* is copied to the memory 13 (a step S44).

When the image data of the terminal 6-*a* is an intra frame, the image data that has been copied to the memory 13 for the terminal 6-*a* is cleared (a step S43), and the new image data is copied to the memory 13 (a step S44).

When the terminal 6-*a* is detected as a speaker (the step S41), the image data of the terminal 6-*a* accumulated in the memory 13 is supplied to the decoder 21 (a step S45).

The decoder 21 decodes the data using the image codec of the supplied image data (a step S46). The last image frame decoded is temporarily saved in the reference image memory 22 (a step S47).

During the time between the speaker detection and the saving of the reference image in the reference image memory 22, the receive unit 31 checks the image data from the speaker terminal 6-*a* (a step S48). When the image data of the terminal 6-*a* is an intra frame, the supplying of the image data of the terminal 6-*a* to the decoder 21 is stopped, and the image data of the terminal 6-*a* is supplied to the medium processing unit 15, completing the processing for switching of a speaker.

When the image data of the terminal 6-*a* is not an intra frame (it means it is an inter frame), the receive unit 31 supplies the image data of the terminal 6-*a* to the decoder 21 (a step S49), and the decoder 21 starts decoding it using the image codec of the image data supplied to the decoder 21 according to the image frame temporarily saved in the reference image memory 22 (a step S50).

The decoded image data is supplied to the encoder 23 and it is re-encoded using the image codecs of the non-speaker conference terminals (a step S51).

When the encoder 23 re-encodes the decoded image data, it encodes the first frame as an intra frame and subsequent frames as inter frames. The re-encoded image data is copied to the medium processing unit 15 (the step S12).

The medium processing unit 15 copies the audio data of the conference participants from the receive unit 31, decodes it, re-encodes it using audio codecs of the non-speaker conference terminals, and mixes it. The audio data mixed using the codec of each conference terminal and the re-encoded image data are copied to the transmission unit 32. The transmission unit 32 converts the image and audio data received from the medium processing unit 15 into formats in which they can be transmitted over the IP network 4 and the 3G network 5, and transmits them to the non-speaker conference terminals, namely SIP terminals 2-*a* to 2-*c* and the terminals 6-*b* and 6-*c* (a step S53).

As described above, in the present embodiment, a multi-point conference can be realized between the SIP terminals and the 3G terminals by the multi-point conference device 1 capable of interconnecting the heterogeneous network of the IP network 4 and the 3G network 5.

In the present embodiment, the 3G network is connected to the IP network as a different kind of network, however, an ISDN network, Internet service provider network (ISP network), or a public switched telephone network (PSTN) may be used.

Further, in the present embodiment, the intra frame transmission request is not made immediately after a speaker is detected, however, it may be done so as in the second embodiment. For instance, the intra frame transmission request may be made by having the multi-point conference device transmit a videoFastUpdate command defined by the ITU-T recommendation H.245 in the case of a 3G network terminal.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

The invention claimed is:

1. A multi-point conference device, communicatively connected to a plurality of terminals, comprising:
   a medium processing unit for detecting a speaker;
   a memory unit for holding an image from a terminal participating in a conference; and
   an image processing unit for decoding an image of a speaker and for re-encoding the decoded image and providing an intra frame, when the speaker is detected at speaker switching;
   said image processing unit configured to transmit the intra frame as an image frame at the time of speaker switching, when said medium processing unit detects a speaker.

2. A multi-point conference system comprising:
   A plurality of terminals; and
   the multi-point conference device, as set fourth in claim 1, the multi-point conference device connected to said plurality of terminals and transmitting/receiving image and audio to perform a conference.

3. The multi-point conference system as defined in claim 2, wherein said image processing unit comprises:
   a decoder unit for decoding an image of a speaker held in said memory unit based on the result of speaker detection by said medium processing unit;
   a reference image memory unit for holding a reference image obtained on decoding by said decoder unit the last image of a speaker held in said memory unit; and
   an encoder unit for re-encoding an image obtained on decoding by said decoder unit an image received after a speaker is detected, based on a reference image held in said reference image memory unit;

wherein at least the first frame of the image of a speaker, received after a speaker is detected, is encoded as an intra frame.

4. The multi-point conference system as defined in claim 2, wherein said terminals and said multi-point conference device are capable of communicating with each other via a communication protocol equipped with no re-transmission procedure.

5. The multi-point conference system as defined in claim 2, wherein the multi-point conference system connects a first network and a second network that is a different kind of a network from the first network.

6. The conference system as defined in claim 2, wherein said image processing unit comprises:
　decoding means for decoding encoded image data transmitted by from a terminal of a speaker targeted for switching at the time of speaker switching; and
　encoding means for re-encoding said decoded image data; wherein
　said encoding means encodes the first image data from a speaker terminal at the time of speaker switching as an intra frame when re-encoding said image data; and
　an intra frame is transmitted to non-speaker terminals participating in a conference at the time of speaker switching.

7. The multi-point conference device as defined in claim 1, further comprising a transmission unit configured for transmitting an intra frame re-encoded by said image processing unit as an image frame at the time of speaker switching when said medium processing unit detects a speaker.

8. The multi-point conference device as defined in claim 1, wherein the image processing unit comprises:
　a decoder unit for decoding an image of a speaker held in said memory unit according to a speaker detection result;
　a reference image memory unit for holding a reference image obtained on decoding by said decoder unit the last image of a speaker saved in said memory unit; and
　an encoder unit for re-encoding an image obtained on decoding by said decoder unit an image received after a speaker is detected, based on a reference image held in said reference image memory unit; wherein
　at least the first frame of the image of a speaker received after a speaker is detected is encoded as an intra frame.

9. The multi-point conference device as defined in claim 1, wherein the image processing unit comprises:
　a memory unit for storing an image in accordance with a codec of a speaker terminal as a result of speaker detection by said medium processing unit;
　a decoder unit for decoding an image of a speaker held in said memory unit;
　a reference image memory unit for holding a reference image obtained on decoding by said decoder unit the last image of a speaker saved in said memory unit; and
　an encoder unit for re-encoding an image obtained on decoding by said decoder unit as an image received by a receive unit after a speaker is detected based on a reference image held in said reference image memory unit; wherein
　at least the first frame of the image of a speaker received by said receive unit after a speaker is detected is encoded as an intra frame; in a manner enabling handling a case where plural items of image data are transmitted by a plurality of terminals connected to a heterogeneous network.

10. The multi-point conference device as defined in claim 1, wherein said image processing unit, after the speaker detection, re-encodes the first image as an intra frame and subsequent frames as inter frames when decoding and re-encoding image data received after a speaker is detected, and transmits the image data to non-speaker terminals; wherein
　said non-speaker terminals are capable of decoding an intra frame at the time of switching of a speaker.

11. The multi-point conference device as defined in claim 1, further comprising:
　a receive unit for receiving a packet from terminals communicatively connected;
　a transmission unit for transmitting a transmission packet;
　a call processing unit for performing call processing;
　a conference control unit for managing the information of conference participants; and
　a memory unit for accumulating image data from terminals participating in a conference corresponding to each terminal;
　said image processing unit including a decoder unit, a reference image memory unit, and an encoder unit; wherein
　said conference control unit, responsive to a speaker detection result from said medium processing unit, notifies said image processing unit of notification to start processing for speaker switching;
　said image processing unit, on receipt of said notification to start processing for speaker switching from said conference control unit, selects the accumulation image data targeted for switching from image data from terminals accumulated in said memory unit to copy the selected image data from said memory unit and the decoder unit decodes the copied image data and accumulates the last image decoded in said reference image memory unit as a reference image;
　said image processing unit receives the image data targeted for switching from said receive unit, said image data being supplied to said decoder unit when said image data is not an intra frame,
　said decoder unit performs decoding processing according to said reference image accumulated in said reference image memory unit, said decoded image data being re-encoded by said encoder unit, the re-encoded image data being supplied to said medium processing unit;
　said medium processing unit mixes the re-encoded image data to be transmitted to non-speaker terminals to supply the resulting data to said transmission unit; and wherein
　said transmission unit packetizes the image data from said medium processing unit to transmit the packetized data to said terminals.

12. The multi-point conference device as defined in claim 11, wherein said receive unit checks image data received from a speaker terminal during the time between speaker detection by said medium processing unit and saving of said reference image in said reference image memory unit by said image processing unit; and wherein
　when said image data is an intra frame, said receive unit stops supplying said image data to said decoder unit, said image data being supplied to said medium processing unit, with processing for speaker switching being completed.

13. A method of performing speaker switching by a multi-point conference device including a medium processing unit for detecting a speaker and an image processing unit for encoding the first image of a speaker received by a receive unit after a speaker is detected as an intra frame, said multi-point conference device switching an image of a speaker by transmitting an intra frame to non-speaker terminals participating in a conference, said method comprising the steps of:

determining whether or not the image of a speaker received is an intra frame;

stopping the processing of said image processing unit and transmitting an intra frame received from a speaker when an intra frame is detected; and continuing the processing of said image processing unit when it is determined that the image of said speaker is not an intra frame.

14. The method as defined in claim 13, wherein said multi-point conference device encodes the first image of a speaker received by a receive unit after a speaker is detected as an intra frame, and transmits the intra frame to non-speaker terminals participating in a conference to control switching of speaker images, said method comprising the steps of:

stopping the processing of said image processing unit and transmitting an intra frame of a speaker received by a receive unit when it is determined that the image of a speaker received by said receive unit is an intra frame; and continuing the processing of said image processing unit when it is determined that the image of a speaker is not an intra frame;

thereby coping with a case wherein a plurality of codecs for image data are transmitted by plurality of terminals connected to a heterogeneous network.

15. The method as defined in claim 13, comprising the steps of:

detecting switching of a speaker by said multi-point conference device connected to a plurality of terminals; and re-encoding by said multi-point conference device the first image as an intra frame and subsequent frames as inter frames when decoding and re-encoding image data received after a speaker is detected, after said speaker detection, and transmitting the image data to non-speaker terminals; with said non-speaker terminals being capable of decoding an intra frame at the time of speaker switching.

16. The method as defined in claim 13, comprising the steps of:

storing image data from a terminal participating in a conference in a memory unit;

detecting a speaker;

decoding an image data of a speaker targeted for switching stored in said memory unit and accumulating the last image decoded in a reference image memory unit as a reference image upon speaker detection;

determining whether an image data received from a speaker terminal after speaker detection is an intra frame;

decoding the image data based on said reference image accumulated in said reference image memory unit in case of the determining result indicating no intra frame, re-encoding the decoded image data wherein the first image data from said speaker terminal is re-encoded at the time of speaker switching as an intra frame in the re-encoding process, transmitting said re-encoded image data to non-speaker terminals participating in a conference; and transmitting an intra frame received from said speaker terminal to non-speaker terminals participating in a conference in case of the decision result indicating an intra frame.

17. The method as defined in claim 13, comprising:

a first step of decoding encoded image data received from terminal of a speaker which is targeted for switching at the time of speaker switching; and a second step of re-encoding said decoded image data; wherein the first image data from a speaker terminal at the time of speaker switching is encoded as an intra frame in the re-encoding process of said second step; and an intra frame is transmitted to non-speaker terminals participating in a conference at the time of speaker switching.

18. A method of performing speaker switching by a multi-point conference device, connected to a plurality of terminals, comprising the steps of:

detecting a speaker;

transmitting an intra frame transmission request to a terminal when said multi-point conference device detects the speaker; and the terminal receiving an intra frame transmission request from said multi-point conference device;

decoding an image of the speaker;

re-encoding the decoded image and providing an intra frame;

and transmitting the intra frame as an image frame, at the time of speaker switching, to said multi-point conference device.

19. The method as defined in claim 18, comprising the step of:

detecting by a multi-point conference device, a speaker from a plurality of terminals connected to a heterogeneous network.

* * * * *